March 7, 1967    J. H. BOICEY    3,307,999
APPARATUS FOR PRODUCING A LAMINATED ASSEMBLY
Filed Oct. 14, 1963

INVENTOR.
James H. Boicey
BY
Nobbe & Swope
ATTORNEYS

United States Patent Office

3,307,999
Patented Mar. 7, 1967

---

3,307,999
APPARATUS FOR PRODUCING A LAMINATED ASSEMBLY
James H. Boicey, Toledo, Ohio, assignor to Libbey-Owens-Ford Glass Company, Toledo, Ohio, a corporation of Ohio
Filed Oct. 14, 1963, Ser. No. 315,878
8 Claims. (Cl. 156—382)

This invention relates generally to improvements in the art of laminating sheets or plates of glass and, more particularly, relates to an improved method and apparatus for laminating glass-plastic structures which include perforated or foraminous members interposed between the sheets in such a manner that the perforations thereof are completely filled with the plastic interlayer material during the laminating process.

The commonly employed method of producing laminated glass structures comprises first assembling two sheets of glass with a thermoplastic interlayer therebetween to form a glass-plastic sandwich, prepressing the sandwich by passing same through a series of rollers, and then effecting final lamination by placing the prepressed sandwich in an autoclave wherein it is subjected to heat and pressure. The prepressing step in the lamination method is a highly important operation because it is necessary that the residual air remaining in the sandwich be exhausted so that it will not appear as bubbles in the finished lamination. The prepressing step also seals the edges of the sandwich so that air will not re-enter during subsequent handling operations prior to autoclaving and further prevents the fluid used in the autoclave, e.g. oil, from entering between the edges of the sandwich and discoloring or otherwise adversely affecting the plastic interlayer.

Another method of laminating glass-plastic sandwiches which is frequently employed for structures having configurations or shapes not conducive to the use of prepressing rolls, and by which the separate step of prepressing is eliminated, comprises placing the sandwich to be laminated into a flexible bag composed of an air impervious material, evacuating the bag to remove the air from between the several sheets of the sandwich, and thereafter sealing the bag and placing it into an autoclave wherein the final laminating of the sandwich takes place.

While the above "bag laminating" procedure has been found, for the most part, to be satisfactory for the production of laminates of complicated shape not adapted for assembly line roller prepress operations, various difficulties have been encountered in adapting this procedure to the production of structures wherein it is desirable to interpose a foraminous member in the interlayer between the sheets. Thus, attempts to laminate such structures have not been successful due to failure of the plastic to flow into and fill the perforations and thus form an integral structure which is necessary in order to attain satisfactory transparency and strength therein. As an example, one such unit, the production of which has been found not adapted for conventional bag lamination, is the viewing window for high frequency microwave cookers or ovens. These windows include a perforated metal member as a radiation shield to protect the user from harm during operation of the high frequency units.

It is, therefore, a principal object of the present invention to provide an improved method and apparatus for laminating glass-plastic sandwiches and which are of particular utility in laminating structures including substantially rigid, foraminous or the like members disposed between the glass sheets and intimately bonded thereto through the plastic interlayer.

A further object of the invention is the provision of an improved apparatus for laminating structures of the above character which is effective to promote the flow of plastic material through all the perforations in the interposed, substantially rigid member during the lamination process and thus form a solid integral unit.

Other objects and advantages of the invention will become more apparent during the course of the following description when taken in connection with the accompanying drawings.

In the drawings wherein like numerals are employed to designate like parts throughout the same:

Briefly stated, the present invention provides a method of laminating composite articles and an apparatus for performing such method, the apparatus comprising a frame adapted to surround or encircle the peripheral edge of the composite assembly to be laminated with the inwardly disposed surface of such frame being in abutting relationship with said peripheral edge, means forming a plurality of passageways through said frame at spaced points about the periphery of the assembly from the inwardly disposed surface of the frame outwardly thereof, and a flexible air-tight envelope encasing the frame and the assembly and having a vacuum connection therein communicating with the passageways for withdrawing air therefrom.

Figure 1:
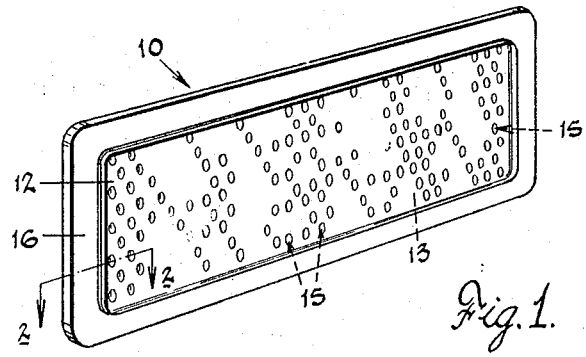
FIG. 1 is a perspective view of a high frequency microwave oven viewing closure produced in accordance with the method and apparatus of the present invention.
Figure 2:
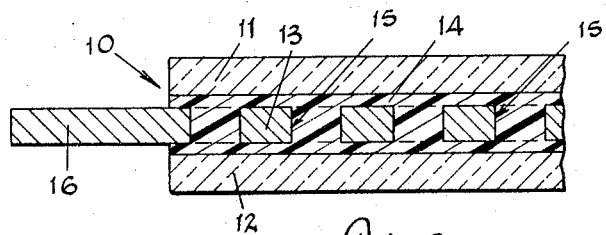
FIG. 2 is an enlarged, fragmentary, cross sectional view taken along the line 2—2 of FIG. 1.

With reference now more particularly to the drawings, there is illustrated in FIGS. 1 and 2 a viewing closure 10 especially adapted for use in a high frequency microwave oven. The viewing closure 10 comprises a pair of spaced, parallel glass sheets 11 and 12 having interposed therebetween a perforate metal plate or shield 13. The sheets 11 and 12 and plate 13 are integrally bonded together by means of a plastic material 14, the plastic material completely filling all the perforations or apertures, indicated at 15, in the metal plate such that an essentially solid structure is provided. The metal plate 13 is of greater area than the glass sheets 11 and 12 and is centrally located therebetween to provide an extended peripheral flange or mounting portion 16 which is preferably free of perforations. In this manner then, the viewing closure 10 may be mounted, for example, in the oven door, with the extended edge portion 16 of the shield 13 being disposed within a groove surrounding a central opening in the door structure whereby the glass sheets are substantially positioned flush with the outer and inner major surfaces of the door. It has been found that this closure provides the oven user with adequate protection from the microwaves employed to heat the oven while still enabling such user to see the interior of the oven and the food being treated or cooked.

Now, while the structure illustrated in FIGS. 1 and 2 has been found to provide a satisfactory viewing closure for high frequency oven windows, difficulty was experienced in laminating the structure by conventional methods due to the fact that the plastic material must flow through and completely fill the openings or perforations in the metal member in order to obtain a suitable transparent structure of adequate physical strength. Neither the known bag laminating procedures nor, of course, the methods involving the use of roller prepressing were found to be effective in this respect.

Figure 3:
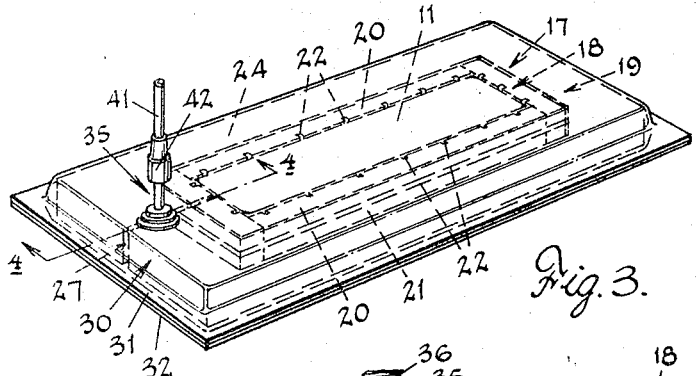
FIG. 3 is a perspective view illustrating the improved laminating apparatus in accordance with the invention.
Figure 5:
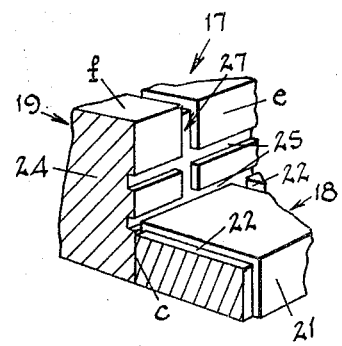
FIG. 5 is a broken, fragmentary view in perspective of the frame members constituting a portion of the apparatus of the invention.
Figure 4:
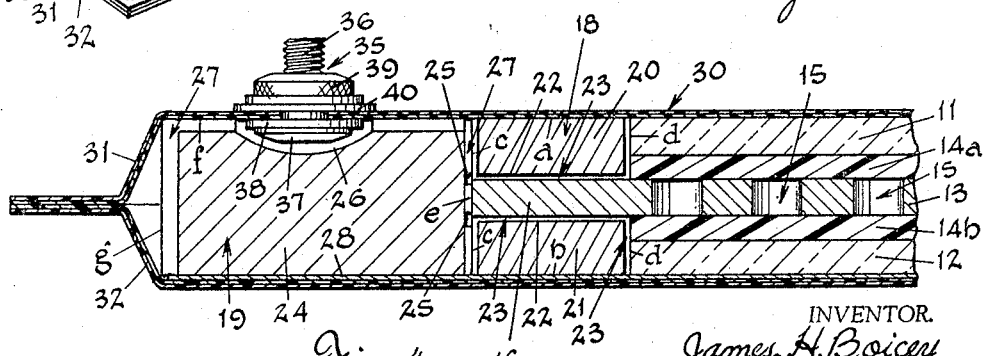
FIG. 4 is an enlarged, fragmentary, cross sectional view taken along the line 4—4 of FIG. 3.

In accordance with the present invention, the unit 10 is laminated by first positioning the glass, plastic and metal sandwich in the frame structure illustrated generally in FIGS. 3 and 4 at 17. The frame 17 is essentially composed of two portions 18 and 19, the inner portion 18 satisfactorily including eight generally rectangular members, four of which, indicated at 20, are located above the extended edge portion 16 of the shield and four of which, indicated at 21, are positioned below such edge portion. Each of the sets of four members 20 and 21 are arranged in opposed, longitudinal and transversely extending pairs so as to form two closed, rectangular rings each having a thickness essentially equal to the combined thickness of one plastic interlayer sheet and one glass sheet, internal perimeters substantially equal to the outer perimeter of the assembled glass and plastic interlayer sheets, and exterior perimeters approximately equal to the perimeter of the shield 13. In this connection, and as best shown in FIG. 4, the unit as assembled in the frame prior to laminating includes two sheets of a transparent thermoplastic interlayer material 14a and 14b, such as polyvinyl butyral, laid in contact with and covering both sides of the perforated portion of the metal shield member 13, with the glass sheets disposed on both outwardly facing sides of the interlayer sheets.

The members 20 and 21, which conveniently may be formed of a synthetic resinous heat resisting material or a hard rubber are provided at equally spaced points along their length with generally U-shaped grooves or notches 22 extending inwardly thereof from three of their four surfaces. Each of the members 20 is arranged with its one surface a not having a groove extending throughout facing upwardly while each of the members 21 has its corresponding surface b facing downwardly. In this manner then, passageways 23 are formed between the members 20 and 21 and either side of the extended edge portion 16 of the shield 13 from the outwardly facing surfaces c of the members to their inwardly disposed surfaces d and vertically from the outer peripheral edges of the glass sheets 11 and 12 to the extended edge portion 16 of the shield 13.

The outer portion 19 of the frame 17 may suitably comprise a one-piece, generally rectangular ring 24, the interior perimeter of which snugly fits about the outer perimeter of the members 20 and 21 and acts to hold same in their position as described above. The ring 24, which has a thickness essentially equal to that of the glass-plastic and shield sandwich, may be composed of a material such as Masonite and is provided with a pair of horizontal grooves 25 on its inwardly facing surface e which extend about the entire periphery thereof.

A concave depression 26 is formed in the upper surface f of the ring 24 at one point therealong which, as hereinafter described, is the point at which the vacuum is applied. In this respect, a generally U-shaped channel or groove 27 is provided in the ring 24 connecting with the depression 26 and extending about the inwardly facing and outwardly facing surfaces e and g, respectively, of the ring as well as the upper surface f thereof. Thus, communicating passageways are provided from the depression 26 completely about the unit 10 when the latter is assembled and positioned within the frame 16 through the channel 27, grooves 25 and passageways 23 as well as between the depression 26 and the outwardly facing surface g of the ring 24.

To support the assembled unit 10 within the frame 17 and keep the former from falling through the hollow portion immediately beneath the frame, a sheet 28 composed of a somewhat flexible, heat resistant material is secured to the bottom surface of the ring 24.

After the unit 10 has been assembled and placed within the frame 17, both are inserted into a flexible bag or envelope 30 of air impervious material which comprises an upper sheet 31 and a lower sheet 32 suitably sealed or joined together at their marginal edges in such a manner as to leave one edge open. While substantially any flexible thin sheet material may be employed as the envelope, cellophane being an example, one specific material which has been found to give particularly good results is a laminate of a polyester film and a polyethylene or polyvinyl film. The polyester film of the laminate, which for example may comprise the polymeric ester of ethylene glycol and terephthalic acid is employed as the external film, such films being well known in the art and conveniently obtainable under the trademark "Mylar." The polyethylene or polyvinyl film is preferably made the inner film of the laminate due to its having a melting or softening range of some depth rather than a sharp melting point as the polyesters do, and also because the melting range of the polyethylene or polyvinyl film is sufficiently below that of the polyester film so that sealing may be readily accomplished by applying sufficient heat through the polyester film to soften and cause the inner polyethylene or polyvinyl films to adhere.

In this same connection, it is advantageous to form the bag material with embossed or quilted surfaces. The corrugations in the bag surfaces resulting from such a construction have been found to be of assistance in that they provide additional passageways for the air to follow when the bag is pressed against the frame and glass surfaces during the evacuation procedure.

While many well known methods and apparatus may be employed in heat sealing the synthetic films, a particularly excellent method involves the use of two pairs of opposed tangentially contacting rollers arranged in tandem, one behind the other. In this connection, edge seals for heat sealing plastics are usually formed by subjecting the walls to a heated squeeze along a single line. While these seals have been found to be acceptable in the majority of cases, it has been found to sometimes result in an undesirable strain on the plastic when the seal is formed closely adjacent to the contents to be enclosed in the envelope. In addition, when employing the embossed plastic sheeting as the bag material, air often becomes entrapped by the embossings themselves and prevents intimate sealing contact between the sheets when a single line seal is used, resulting in an imperfect joint.

It has now been found that a reliable and strong closure can be expeditiously achieved by employing two pairs of rollers arranged in tandem. The first pair consists of two steel, peripherally contacting rolls of a desired width, for example one inch, which are heated and the two films to be sealed first passed between them. Immediately following the first pair is a second pair of rollers of similar overall width but one of which is fitted with two laterally spaced O-rings to form two spaced ridges thereon. The second pair of rollers is cold and the O-rings form localized pressure points for continuously pressing the heat softened films into perfectly intimate bonding contact with each other along two spaced narrow lines. This type of sealing has been found to effectively prevent air leakage due to air which was entrapped by the embossed surface or the embossing cells formed when a single pair of opposed rollers were used.

After the frame and assembled unit 10 are inserted in the flexible bag, the edge thereof that has been left unsealed is sealed as above described.

As a means of withdrawing air from the envelope or bag 30 after complete sealing thereof, a vacuum connection 35 is formed therein. The connection 35 comprises a hollow, externally threaded stem 36 inserted through a hole in the upper sheet 31 and having a seat 37 adjacent the undersurface of the upper sheet. A rubber washer 38 of relatively larger diameter than the hole encircles the stem 36 and spaces the seat 37 from the upper sheet. The threaded portion of the stem is provided with a nut 39 and rubber washer 40 assembly carried outwardly of the sheet 31 which, when screwed downwardly on the stem, grips the sheet between the washers 38 and 40 to provide a relatively air tight joint between the vacuum connection 35 and the envelope 30.

When the frame 17 is properly orientated within the envelope, the seat 37 is received within the concave depression 26 provided in the upper surface f of the ring 24. To evacuate the envelope, a hose or the like 41 having an internally threaded coupling 42 on one end thereof is threaded over the stem 36 of the vacuum connection. The other end of the hose (not shown) communicates with a suitable vacuum pump or the like.

With the frame 17 encased within the flexible bag or envelope 30 and the edges thereof sealed together, the bag assembly is evacuated so as to remove residual air that may have become entrapped between the glass sheets 11 and 12, the plate 13 and the thermoplastic interlayer sheets 14a and 14b which, if left therebetween, would show up as objectionable bubbles in the resulting laminated product. Now as previously mentioned, extreme difficulty has been encountered in laminating units of the type illustrated at 10 due to the perforations in the plate 13. Thus conventional apparatus is not capable of withdrawing all of the air which becomes entrapped in the perforations when assembling the units for lamination. However, the novel structure in accordance with this invention has been found to successfully enable the complete removal of air from the perforations which, in turn, makes it possible for the thermoplastic interlayer material to flow into and completely fill the perforations forming an integral, commercially acceptable composite unit.

In this respect, when the vacuum is applied the air between the several layers comprising the assembled unit is drawn outwardly into the passageways 23 formed between the members 20 and 21 and either sides of the extended edge portion 16 of the shield 13 from the outwardly facing surfaces c of the members to their inwardly disposed surfaces d and vertically from the outer peripheral edges of the glass sheets to the extended edge portion 16. From these passageways, the air is pulled into the grooves 25 communicating therewith and formed on the inwardly facing surface e of the ring 24, into and through the portion of the channel 27 inwardly of the concave depression 26 (along surfaces e and f), and finally out of the envelope through vacuum connection 35. At the same time the air within the envelope 30 around the outer edges of the ring 24 is drawn into the depression 26 through the portion of the channel 27 cut into the upper surface f and surface g thereof. During the vacuum application, the atmosphere of course applies pressure evenly to the upper and lower surfaces of the bag, which in turn transmits this pressure to the top and bottom surfaces of the unit.

It has been found that with a laminate of the type illustrated at 10 and including a perforate metal member .120 inch by 5 inches by 15 inches, an initial evacuation period of about 15 minutes at approximately 28 or 29 inches of mercury column is sufficient to evacuate the bag to an extent such that the thermoplastic interlayer material flows into and fills all of the perforations during merely a subsequent heating operation. In this respect, after the initial evacuation period and with the vacuum still being applied to the envelope, the bag assembly is next clamped to a support and immersed in a tank containing a suitable liquid, such as oil which has been preheated to a temperature of approximately 250° F. After 3 minutes the vacuum is discontinued and the bag left in the tank for approximately 20 minutes with the oil being maintained at a temperature on the order of 250° F. during this period. The bag may then be removed, opened and the laminate taken out. It has been found that the above cycle, when employing the novel apparatus herein disclosed, results in the production of a commercially acceptable, transparent microwave shielding viewing closure wherein all of the perforations in the metal shield are completely and evenly filled with the thermoplastic interlayer material.

It is to be understood that the form of the invention herewith shown and described is to be taken as an illustrative embodiment only of the same, and that various changes in the shape, size and ararngement of parts, as well as various procedural changes may be resorted to without departing from the spirit of the invention.

I claim:

1. Apparatus for producing a laminated assembly composed of a pair of glass sheets and an interposed foraminous member integrally bonded to said glass sheets through a thermoplastic interlayer material which completely fills the perforations in said member, said apparatus comprising an evacuation frame adapted to encircle the peripheral edge of said assembly with the inwardly disposed surface of said frame being in abutting relationship with said peripheral edge, means forming a plurality of passageways through said frame at spaced points about the periphery of said assembly from the inwardly disposed surface of said frame outwardly thereof, and a flexible air-tight envelope encasing said frame and said assembly and having a vacuum connection therein communicating with said passageways for withdrawing air therefrom.

2. Apparatus for producing a laminated assembly composed of a pair of glass sheets and an interposed foraminous member integrally bonded to said glass sheets through a thermoplastic interlayer material which completely fills the perforations in said member, said apparatus comprising an evacuation frame adapted to encircle the peripheral edge of said assembly with the inwardly disposed surface of said frame being in abutting relationship with said peripheral edge, a plurality of grooves formed in said inwardly disposed surface of said frame at spaced points about the periphery of said assembly providing passageways therebetween, means forming a plurality of channels through said frame from the inwardly disposed surface thereof outwardly of said frame, said channels communicating with said passageways, and a flexible air-tight envelope encasing said frame and said assembly and having a vacuum connection therein communicating with said channels through which air is withdrawn from said passageways and channels.

3. Apparatus for producing a laminated assembly as defined in claim 2, wherin said frame includes a depression in one of its surfaces other than said inwardly facing surface for receiving said vacuum connection, said channels communicating with said depression.

4. Apparatus for producing a laminated assembly composed of a pair of glass sheets and an interposed foraminous member integrally bonded to said glass sheets through a thermoplastic interlayer material which completely fills the perforations in said member, said foraminous member being of greater area than said glass sheets to form an extended peripheral flange portion about said assembly, said apparatus comprising an evacuation frame adapted to encircle the peripheral edge of said assembly including said flange portion of said foraminous member with the inwardly disposed surface of said frame in abutting relationship with said edge and flange, means forming a plurality of passageways through said frame at spaced points about the periphery of said assembly from said inwardly disposed surface outwardly thereof, said passageways extending adjacent said flange portion of said foraminous member, and a flexible air-tight envelope encasing said frame and said assembly and having a vacuum connection therein communicating with said passageways for withdrawing air therefrom.

5. Apparatus for producing a laminated assembly as defined in claim 4, wherein said means forming said passageways in part comprise grooves cut into said inwardly disposed surface of said frame including those portions thereof abutting said flange.

6. Apparatus for producing a laminated assembly composed of a pair of glass sheets and an interposed foraminous member intergrally bonded to said glass sheets through a thermoplastic interlayer material which completely fills the perforations in said member, said foraminous member being of greater area than said glass sheets to form an extended peripheral flange portion about said assembly, said apparatus comprising an evacuation frame adapted to encircle the peripheral edge of said assembly including said flange portion of said foraminous member with the inwardly disposed surface of said frame in abutting relationship with said edge and flange, means forming a plurality of passageways through said frame at spaced points about the periphery of said assembly from said inwardly disposed surface outwardly thereof, said passageways extending adjacent said flange portion of said foraminous member, a flexible air-tight envelope encasing said frame and said assembly and having a vacuum connection therein, a depression in said frame adjacent the vacuum connection in said flexible envelope, and means in said frame communicating with said depression and said passageways whereby air may be withdrawn from said passageways and through said vacuum connection.

7. Apparatus for use in laminating an assembly comprising a substantially flat foraminous member, a pair of thermoplastic sheets arranged one on either side of said foraminous member, and a pair of glass sheets outwardly of said thermoplastic sheets and also arranged one on either side of said foraminous member, all of said sheets and said member being disposed in face-to-face relationship to form a sandwich-like structure with said foraminous member being of greater area than said sheets to form an extended peripheral flange portion about said assembly, said apparatus comprising a frame including inner and outer rings, said inner ring being disposed in abutting surrounding relationship to the edges of said glass and thermoplastic sheets and including substantially identical portions arranged above and below said extended flange of said foraminous member in contact therewith and dimensioned so as to fit substantially flush with the outermost edge of said flange portion, said outer ring surrounding said inner ring and having its inwardly disposed surface in abutting relationship therewith, each of said inner ring portions having grooves therein spaced along their perimeters and being positioned such to provide passageways between the edges of said glass and thermoplastic sheets and the inwardly diposed surface of said outer ring along said extended peripheral flange portion of said foraminous member, said outer ring including at least two spaced continuous grooves in its inwardly disposed surface which extend completely thereabout, one of said continuous grooves communicating with the grooves formed in the upper of said inner ring portions and one with the grooves formed in the lower of said inner ring portions, said outer ring also having a generally U-shaped groove formed therein including a portion in its inwardly directed surface communicating with said continuous grooves therein, and a flexible air-tight envelope encasing said frame and said assembly and having a vacuum connection therein, said vacuum connection communicating with said generally U-shaped groove in said outer frame member.

8. Apparatus for use in laminating an assembly as defined in claim 7, wherein said outer frame includes a depression in one of its surfaces other than said inwardly disposed surface for receiving the vacuum connection in said flexible envelope, said vacuum connection communicating with said U-shaped groove in said outer frame member through said depression.

References Cited by the Examiner
UNITED STATES PATENTS

| | | | |
|---|---|---|---|
| 1,842,324 | 1/1932 | Griffith | 156—101 |
| 2,783,176 | 2/1957 | Boicey | 156—286 |

MORRIS SUSSMAN, *Primary Examiner.*

ALEXANDER WYMAN, W. J. VAN BALEN,
*Assistant Examiners.*